(12) United States Patent
Koo et al.

(10) Patent No.: US 9,824,282 B2
(45) Date of Patent: Nov. 21, 2017

(54) SECURITY CAMERA SYSTEM USING POWER SUPPLY BY ELECTROMAGNETIC INDUCTION SCHEME

(71) Applicant: FERRARISPOWER CO., LTD, Gyeonggi-do (KR)

(72) Inventors: Ja-Il Koo, Seongnam-si (KR); Tae-Kyoung Kim, Incheon (KR)

(73) Assignee: FERRARISPOWER CO., LTD., Gyeonggi-do (KR)

( * ) Notice: Subject to any disclaimer, the term of this patent is extended or adjusted under 35 U.S.C. 154(b) by 150 days.

(21) Appl. No.: 14/782,592

(22) PCT Filed: Apr. 4, 2014

(86) PCT No.: PCT/KR2014/002932
§ 371 (c)(1),
(2) Date: Oct. 5, 2015

(87) PCT Pub. No.: WO2014/163432
PCT Pub. Date: Oct. 9, 2014

(65) Prior Publication Data
US 2016/0063329 A1  Mar. 3, 2016

(30) Foreign Application Priority Data
Apr. 4, 2013  (KR) .................. 10-2013-0036946

(51) Int. Cl.
*H04N 7/12* (2006.01)
*H04N 11/02* (2006.01)
(Continued)

(52) U.S. Cl.
CPC ..... *G06K 9/00771* (2013.01); *G08B 13/1966* (2013.01); *G08B 13/19632* (2013.01);
(Continued)

(58) Field of Classification Search
None
See application file for complete search history.

(56) References Cited

U.S. PATENT DOCUMENTS

2008/0117316 A1* 5/2008 Orimoto ............. H04N 5/2251
                                                        348/240.3
2010/0076612 A1* 3/2010 Robertson .......... H02M 5/4505
                                                        700/286
(Continued)

FOREIGN PATENT DOCUMENTS

KR    20-0303762 Y1   2/2003
KR    10-2002-0030302 A   4/2003
(Continued)

OTHER PUBLICATIONS

WIPO, Korean International Search Authority, International Search Report dated Jul. 22, 2014 in International Patent Application No. PCT/KR2014/002932 (with translation), 3 pages.

*Primary Examiner* — Talha M Nawaz
(74) *Attorney, Agent, or Firm* — Masuvalley & Partners

(57) ABSTRACT

A security camera system using a power supply by an electromagnetic induction scheme comprises; a CT core detachably installed on a power transmission and distribution line and producing electric power by the electromagnetic induction scheme and; a power transformer for transforming an AC power generated from the CT core to a DC voltage; a camera module for recording a security video using power supplied by the transformer; a wireless communication module for transmitting an audio and a video data captured by the camera module; and a stabilizer module for correcting the shake of a video when capturing a security video.

The security camera system provided with the power supply device as a main power supply thereto generating an electric power by the electromagnetic induction scheme using the current flowing around the power distribution line saves time and cost related to power supply construction so that the productivity may be improved.

4 Claims, 8 Drawing Sheets

(51) Int. Cl.
| | |
|---|---|
| *H04N 11/04* | (2006.01) |
| *G06K 9/00* | (2006.01) |
| *H04N 5/225* | (2006.01) |
| *H04N 7/18* | (2006.01) |
| *G08G 1/04* | (2006.01) |
| *H04N 5/232* | (2006.01) |
| *H04N 5/63* | (2006.01) |
| *G08B 13/196* | (2006.01) |

(52) U.S. Cl.
CPC ......... *G08B 13/19634* (2013.01); *G08G 1/04* (2013.01); *H04N 5/2251* (2013.01); *H04N 5/23248* (2013.01); *H04N 5/63* (2013.01); *H04N 7/183* (2013.01)

(56) References Cited

U.S. PATENT DOCUMENTS

| | | | | |
|---|---|---|---|---|
| 2012/0072042 | A1* | 3/2012 | Moriai | H02J 7/0013 |
| | | | | 700/297 |
| 2013/0015705 | A1* | 1/2013 | Abe | H02J 5/005 |
| | | | | 307/29 |

FOREIGN PATENT DOCUMENTS

| | | |
|---|---|---|
| KR | 20-2007-0000853 U | 7/2007 |
| KR | 10-2008-0073100 A | 9/2008 |
| KR | 10-1040732 B1 | 6/2011 |
| KR | 10-2012-0038048 A | 4/2012 |
| KR | 10-2011-0047247 A | 4/2013 |
| KR | 10-2012-0137382 A | 7/2014 |

* cited by examiner

SECURITY CAMERA SYSTEM USING POWER SUPPLY BY ELECTROMAGNETIC INDUCTION SCHEME

RELATED APPLICATIONS

This application is the U.S. National Phase of and claims priority to International Patent Application No. PCT/KR2014/002932, International Filing Date Apr. 4, 2014, entitled Security Camera System Using Power Supply In Electromagnetic Induction Scheme, which claims benefit of Korean Patent Application No. 10-2013-0036946 filed Apr. 4, 2013; both of which are incorporated herein by reference in their entireties.

TECHNICAL FIELD

The present invention relates to a security camera system using a power supply by an electromagnetic induction scheme, and more particularly to a security camera system provided with a power supply using an induced electromotive force from a power line adjacent to a security camera installation site without an extra power supply construction so to save related expenses and therefore the security camera system can be easily relocated when a surveillance area is changed.

BACKGROUND ART

In general, a security system may be easily installed on areas such as an entrance of a building, some important sites inside a company, an underground parking lot and an entrance of house where an easy access to a required power source for operating the security system is secured. However, a large scaled extra power construction is required to secure the power source for operation of the security system on areas such as city streets, a trail or the Olle trail in which a demand for security system has recently been raised.

Further, the reality is that a budget to secure such a power source occupies a major portion of the budget for entire security system while the demand for such security system tends to increase in a general industry sector or in a military sector.

And further, it is getting harder to secure a 220V power source for the camera system from the outside particularly due to the urbanization and ongoing smart grid system, and therefore securing such a power source has become a serious matter for it requires an extra power construction.

Under a circumstance that the security camera and the system are continuously developing and the number of demanding sites is rapidly increasing, a huge amount of budget for securing the power source may be required if an economical alternative way to secure the power source in not prepared, and then the following obstacles may arise in realizing a practical system.

Firstly, a prepayment of power construction expenses increases in advance to securing the power source for operating the security camera.

Secondly, a construction expense related to installation and removal of the security camera increases in the case of a security camera being relocated on request.

Thirdly, in order to cover the increasing demand from fields to implement the security camera system an extra transformer is required in sites having only a high voltage power line available and lacking common power source of 220V.

DISCLOSURE

Technical Problem

The present invention relates to a security camera system using a power supply by an electromagnetic induction scheme provided with a power supply using an induced electromotive force from a power line adjacent to a security camera installation site without an extra power supply construction so to save related expenses and therefore the security camera system can be easily relocated when a surveillance area is changed.

The object of the present invention is not limited to the aforesaid, but other not described herein will be clearly understood by those skilled in the art from descriptions below.

Technical Solution

A security camera system using a power supply by an electromagnetic induction scheme to solve the technical problem in accordance with the present invention comprises; a power CT core detachably installed on a power transmission and distribution line and producing electric power by the electromagnetic induction scheme; a power transformer for transforming AC power generated in the power CT core to DC voltage; a camera module for capturing a security video using power supplied by the power transformer; a wireless communication module for transmitting an audio and a video data captured by the camera module; and a stabilizer module for correcting the shake of a video when capturing a security video.

The security camera system further comprises a signal processor which processes the video data and the audio data for transmitting the captured motion pictures from the camera module.

The power CT core is a non-contact type, and generates an electric power independently.

The power CT core is configured to plurality of power CT cores in accordance with required amount of electric energy.

The power CT core is a structure comprising a top assembly in which each of a core and a coil is installed therein; a bottom assembly corresponding to the top assembly; a hinge of which the top assembly and the bottom assembly are rotatably coupled to each other; and a lock clip selectively opening and closing the top assembly and the bottom assembly.

The power CT core and the power transformer are incorporated with the camera module, the stabilizer module and the wireless communication module into an integral structure or installed separately to provide power supply to the camera module, the stabilizer module and the wireless communication module.

The power CT core is attached and separated by controlling a separator device disposed separately.

Advantageous Effects

According to the present invention, the time and expenses associated with power construction for securing power source can be saved and the productivity can consequently be improved by providing a separable power supply device designed to generate main power from a current around the power distribution line by an electromagnetic inductive scheme to a security camera system as main power.

Further, the camera system can be installed or relocated at any site in which a power distribution line exists without an extra power construction so that the expandability and stability of the security camera are achieved, and the construction expense can be saved, and the power source can be increased by simply adding the power CT core to where the power line current is weak so that the number of sites to implement the security camera system can be maximized.

MODE FOR INVENTION

Figure 1:
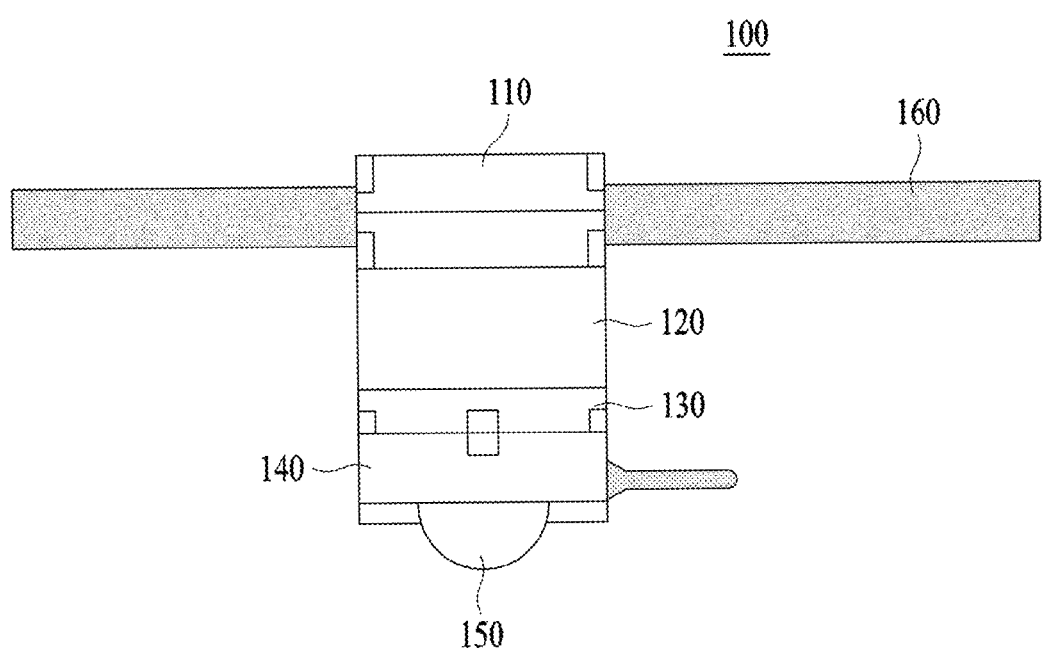
FIG. 1 is a front view of a general system configuration of a security camera system using power supply by an electromagnetic induction scheme in accordance with the present invention.

Preferred embodiments of the present invention will be described below in more detail with reference to the accompanying drawings so that those skilled in the art can easily understand other advantages and performances of the present invention according to the descriptions. However, detailed descriptions related to well-known functions or configurations will be ruled out in order not to unnecessarily obscure subject matters of the present invention.

Further, like reference numerals refer to like elements throughout.

And further, when it is described that an element is "connected to" another element, it should be understood that the element may be "directly connected to" the other element but still another element may be "connected to" the other element between them. And when it is described that an element "includes" another element, it should be understood that the element may include more of other elements unless otherwise specified that the element excludes the other elements.

Hereinafter, an embodiment will be described in detail with reference to the accompanying drawings.

Figure 2A:
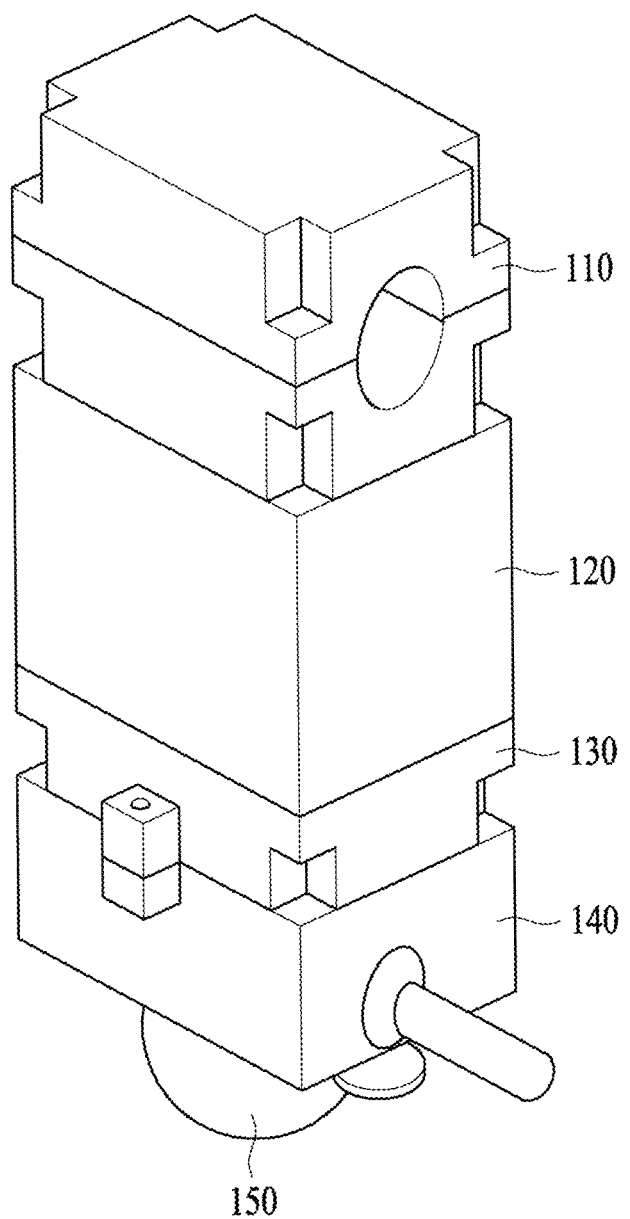
FIGS. 2A and 2B are perspective views of FIG. 1 illustrating the combination relation.
Figure 2B:
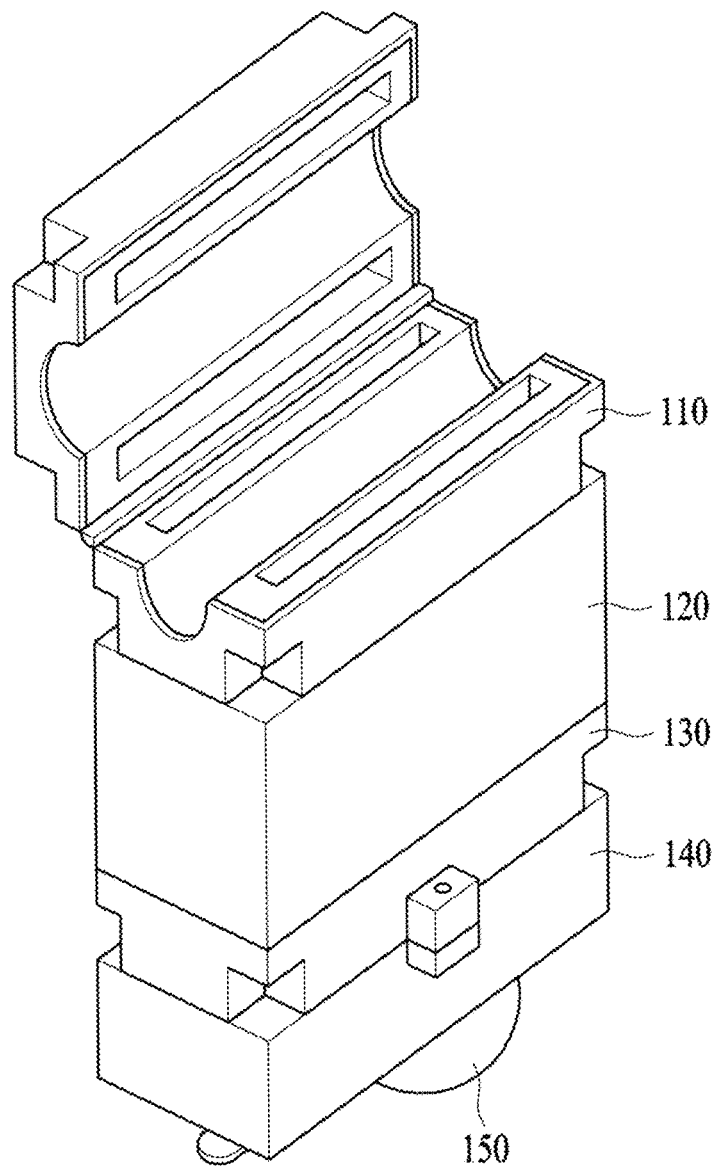
Figure 3A:
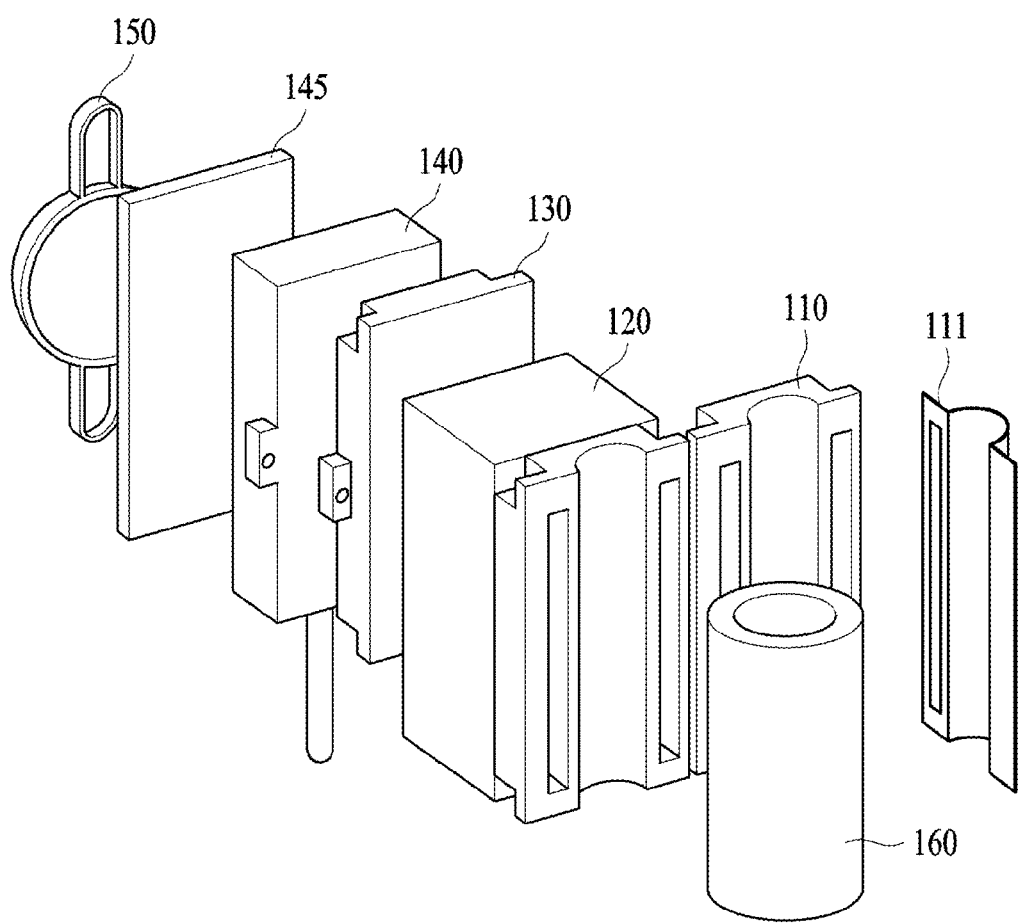
FIG. 3A and FIG. 3B are exploded views of FIG. 1.
Figure 3B:
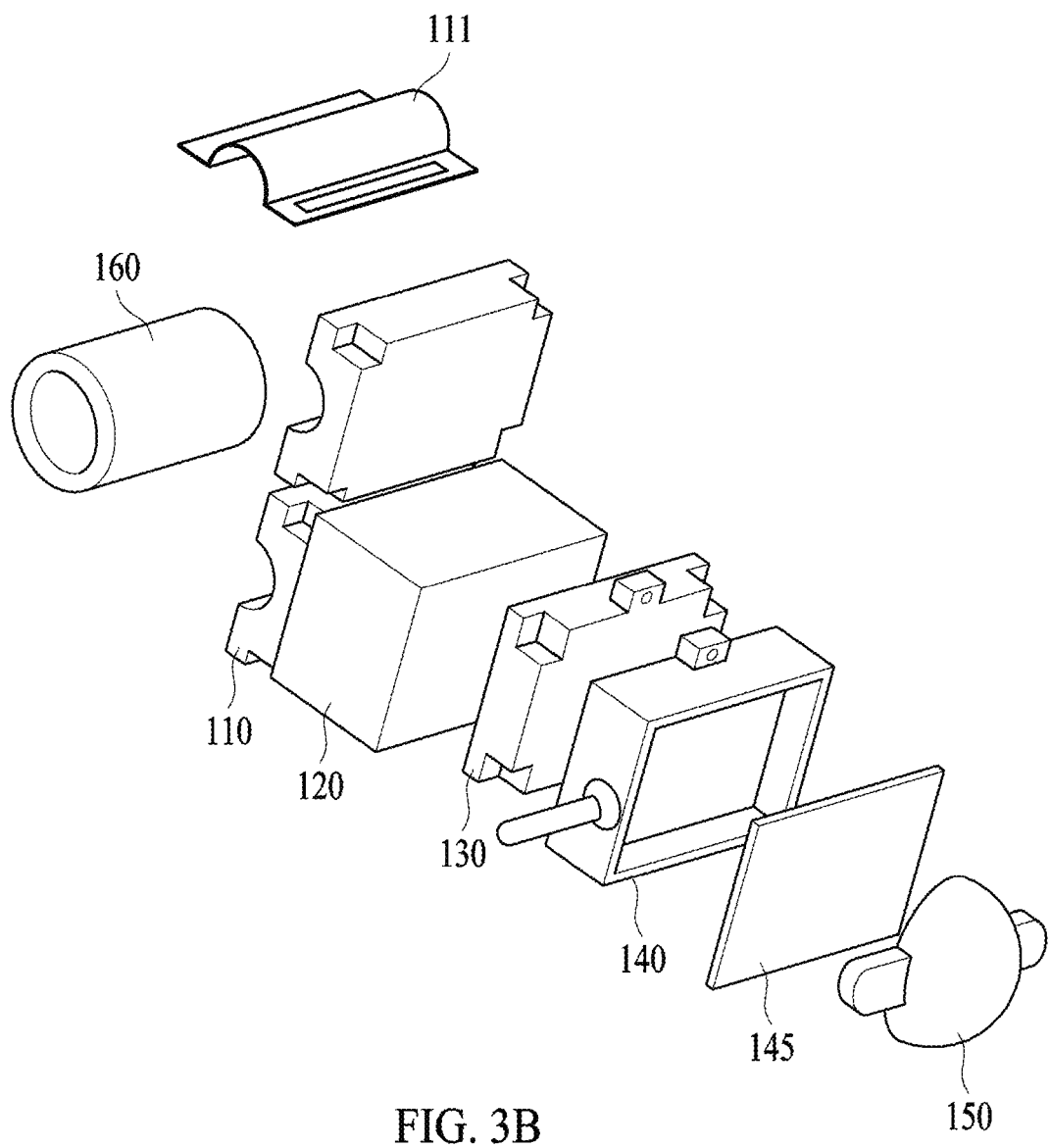

FIG. 1 is a front view of a general system configuration of a security camera system using power supply by an electromagnetic induction scheme in accordance with the present invention, FIGS. 2A and 2B are perspective views of FIG. 1 illustrating the combination relation, and FIG. 3A and FIG. 3B are exploded views of FIG. A.

As shown in FIG. 1, the security camera system (100) using the power supply by the electromagnetic induction scheme in accordance with the present invention is configured to comprise a power CT core (110) detachably installed to a power transmission and distribution line (160) for generating power by the electromagnetic induction scheme; a power transformer (120) for transforming AC power generated in the power CT core (110) to DC voltage; a camera module (150) for recording a security video using power supplied by the power transformer; a wireless communication module (140) for transmitting a video and audio data of the video filmed by the camera module; a stabilizer module (130) for correcting the shake of a video when filming the security video; and a signal processor (145) for signal-processing the video data and the audio data of the recorded video for transmission the same to the outside.

The power CT core (110) refers to an independent power source for power supply which generates power in non-contact way without an external power supply. The power CT core generates a current from a current flowing around the power line (W, 160) using an induced electromotive force. For example, when a bigger current flows in the power line (W, 160) a magnetic field occurs to the power CT core (110) by the Ampere's right hand screw rules, and the electromotive force is induced in the coil by the Faraday's law and consequently an electric power is generated. That is, a small current is produced corresponding to a big current from the power line (W, 160) proportionally.

More particularly, the power CT core (110) is composed of the core (not shown) and the coil (not shown) wound around the core, and therefore the power CT can transform the high power line voltage with high current to a low voltage with low current by the number turns of the coil. In the present invention, the power CT core (110) is made to a detachable ring type which, however, may be structured to a clamp type.

Such a power CT core (110) comprises a top assembly having the core and coil disposed respectively therein; a bottom assembly corresponding to the top assembly; a hinge having the top assembly and the bottom assembly rotatably coupled thereto; and a lock clip selectively opening and closing the top assembly and the bottom assembly. The core and coil are included inside of each of the assembly so to induce an electromotive force.

According to the above structure, each of the CT is detachably manufactured to a separable type it is convenient for the case that each of the CT is additionally installed to the power line (W) for expansion or removed from the power line for replacement.

Further, in the case of using such a separable power CT core, when the magnetization of the power CT core is separately controlled outside it would be impossible to remove the system discretionally, and therefore the system can be protected from a risk of being stolen. A separator device may be separately provided for installation and/or removal of the power generation power CT core, and therefore an unauthorized installation and/or removal can be controlled.

That is, a CT-based core becomes an electromagnetic structure when a current is applied in the power line, then the power CT core can not be removed by a physical force, and therefore the power CT core cannot be removed unless that is allowed by the magnetization control except for a blackout of which the power line current is stopped for an emergency situation.

The power transformer (120) receives each of a secondary current induced and outputted by the electromotive force of the power CT core (110) and may transform to a desired DC voltage for output. The power transformer (120) herein is provided with a charging system for charging an emergency battery of an emergency power source in the case of a blackout, and the battery capacity should be enough to withstand an emergency call signal transmission by a wireless communication module, and a video transmission of the emergency status for as long up to one (1) minute as possible. This may be used in the future to keep records of an installation site under an emergency situation.

Each of the audio and video data obtained from the real time filming of a video by the camera module (150) is signal-processed by the signal processor (145) for transmitting the same to the outside by the wireless transmission scheme.

The wireless communication module (140) is supplied with the electric power by the independent source type power CT (110) and may include an RF transceiver unit and a WLAN transceiver unit and the like. And a remote monitoring surveillance camera module designed to monitor the load of the power transmission and distribution line (W) monitors the security status in real-time and may transmit the audio and video data by the wireless communication network. The RF transceiver unit herein is a communication module for a short-range communication using a medium-wave frequency band for performing data communication with the system located in a relatively short distance of several kilometers. Meanwhile, the WLAN transceiver unit is a communication module for wireless internet communication and it may perform a direct data communication with the wireless integration system by an adjacent AP (access point) or a smart device in accordance with the TCP/IP communication protocol.

The stabilizer module (130) may be applied with an equilibrium maintenance device such as a gyroscope to correct the shake of the video caused by the shake of the power line.

Figure 4A:
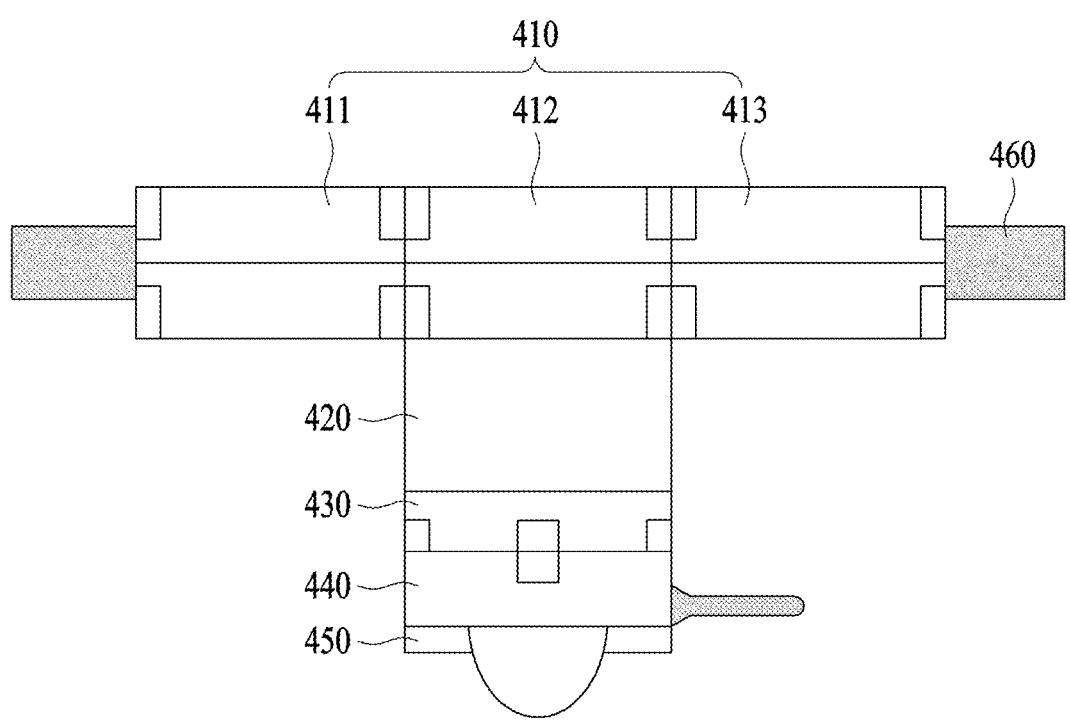
FIG. 4A and FIG. 4B are a front view of the security camera system composed of multiple power CT cores.
Figure 4B:
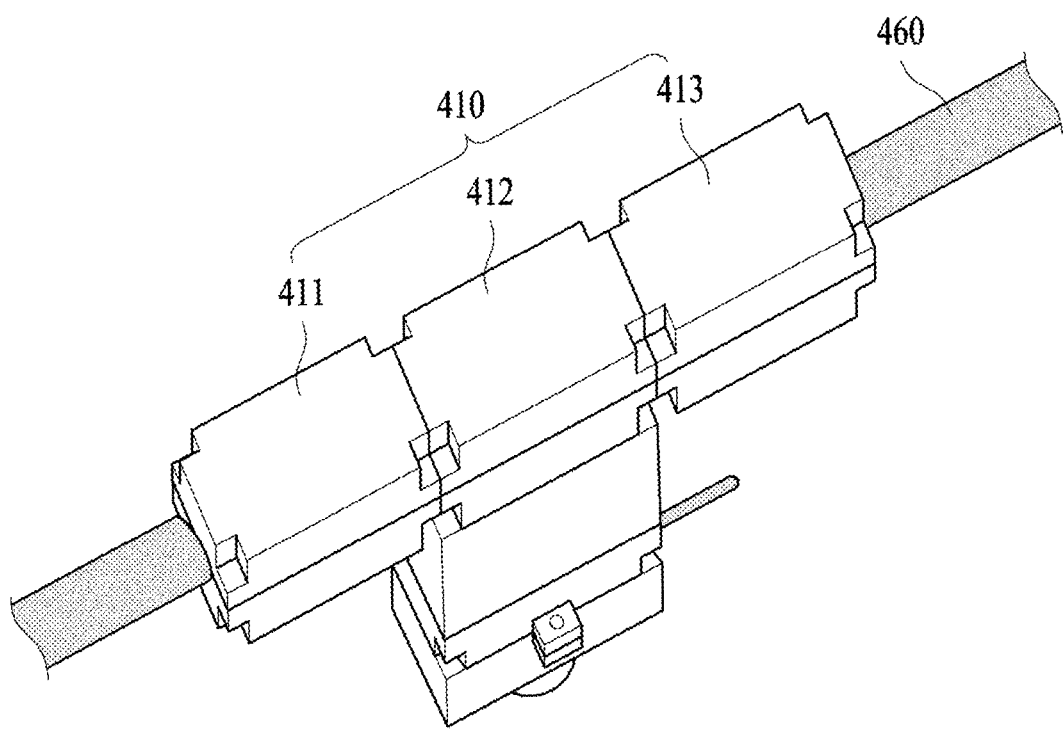
Figure 5:
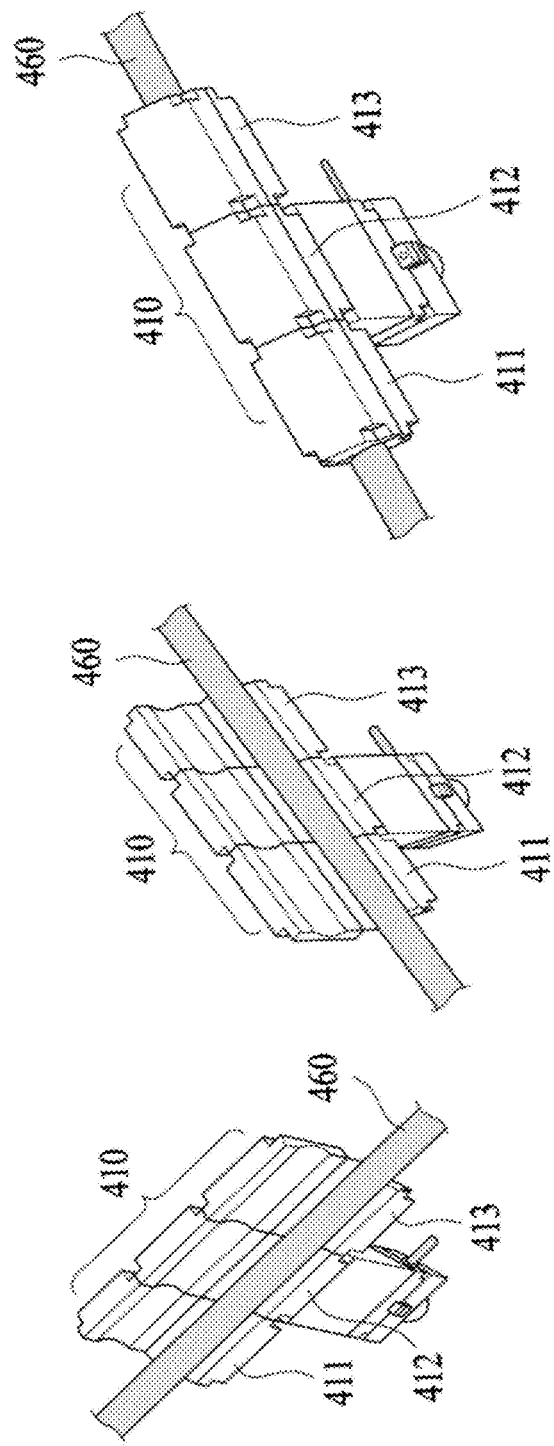
FIG. 5 is perspective views of multiple power CT cores illustrating the state of the same installed in the power line.

Further, FIGS. 4A and 4B illustrate a security camera system configured with multiple power CT cores in the present invention, and FIG. 5 illustrates multiple power CT cores being installed on a power line.

Referring to FIGS. 4A, 4B and 5, the power CT (410) may be installed as multiple units as required for power supply without having to be installed as single unit. An exemplary example of three units of the power CT cores being installed is shown in FIGS. 4A, 4B and 5, and the power CT cores may be additionally installed or removed as required by each part.

More particularly, as shown in the exemplary example, in the case that an excitation voltage occurs in the power line so that an average power line current is not high enough to operate the security camera system, the power source can be secured by simple installation of an additional CT as an external power source in the same way of adding a common battery. Through this, the minimum power required is ensured, and the easy installation and removal process can maximize the productivity.

At this point, the number of the power CT cores that can be installed is not theoretically limited but it may be limited by depending on practical situation of the installation sites. That is, the number of power CT cores may be adjusted by adding or removing the power CT cores to meet the size of electric power of which the load requires so that an optimum level of electric power can be outputted.

Meanwhile, a power device can be separately installed from the camera module by installing the power CT core (410) apart from the camera module (450). That is, the power CT core (410) and the power transformer (420) may be incorporated into a integrated structure with the camera module (450), the stabilizer module (430) and the wireless communication module (440), or installed separately (not shown) so to supply power to the camera module (450), the stabilizer module (430) and the wireless communication module (440). That is, the security camera portion and the wireless communication module may only be connected to a general power source to perform the role of a general security camera, or the power CT core can be separately installed and used while the rest portions are used in fixed state to the fixed area. Accordingly, the power block can possibly be installed at own discretion depending on the installation environment.

Accordingly, a security camera system can be configured on the basis that a separable CT-based power supply device is disposed to be used with common power source in accordance with the present invention, and a stable power source can possibly be secured as long as the current flows in the power line regardless of the voltage.

Such a system is provided with a communication module and a central processing unit that can drive a software associated with the communication module both disposed therein so that common application programs can be implemented as these are, a product upgrade in the future can be performed by a partial replacement of the very related part and therefore a large portion of maintenance cost as well as system upgrade expense can be reduced.

While this invention has been particularly shown and described with reference to preferred embodiments thereof, it will be apparent to those skilled in the art that various modifications and variations can be made in the present invention without departing form the spirit or scope of the invention. Therefore, the scope of the invention is defined not by the detailed description of the embodiments but by the appended claims, and all differences within the scope will be construed as being included in the present invention.

The invention claimed is:

1. A security camera system using power supply by an electromagnetic induction scheme comprising;
   a power generation CT (current transformer) core detachably installed in a non-contact way on a power transmission and distribution line and generating an electric power independently by the electromagnetic induction scheme from the power transmission and distribution line;
   a power transformer for transforming an AC power generated from the power generation CT core to a DC voltage;
   a camera module for recording a security video using the transformed power supplied by the power transformer;
   a wireless communication module for transmitting an audio and video data of the security video captured by the camera module; and
   a stabilizer configured to control the shake of a video when capturing a security video,
   wherein the power generation CT core is configured as multiple power generation CT cores to ensure an optimal amount of electrical energy for operating the security camera system, and
   wherein each of the multiple power generation CT cores is configured to be selectively detachable by a detacher device which is installed separately to perform magnetization control.

2. The security camera system of claim 1 further comprising;
   a signal processor which signal-processes an audio data and a video data of the recorded video for transmitting the same outside.

3. The security camera system of claim 1; wherein the power generation CT core is structured to comprise a top assembly in which each of a core and a coil is installed therein; a bottom assembly corresponding to the top assembly; a hinge of which the top assembly and the bottom assembly are rotatably coupled to each other; and a lock clip selectively opening and closing the top assembly and the bottom assembly.

4. The security camera system of claim 1; wherein the power generation CT core and the power transformer are incorporated with the camera module, the stabilizer and the wireless communication module to form an integral structure or installed separately to provide power supply to the camera module, the stabilizer and the wireless communication module.

* * * * *